United States Patent
Onizuka et al.

(10) Patent No.: US 9,755,238 B2
(45) Date of Patent: Sep. 5, 2017

(54) NON-AQUEOUS ELECTROLYTE SECONDARY BATTERY AND MANUFACTURING METHOD THEREOF

(75) Inventors: Hiroshi Onizuka, Toyota (JP); Tomohiro Nakano, Okazaki (JP); Kyoko Kikuchi, Seto (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 238 days.

(21) Appl. No.: 14/359,433

(22) PCT Filed: Sep. 10, 2012

(86) PCT No.: PCT/JP2012/005720
§ 371 (c)(1),
(2), (4) Date: May 20, 2014

(87) PCT Pub. No.: WO2013/076893
PCT Pub. Date: May 30, 2013

(65) Prior Publication Data
US 2014/0329141 A1   Nov. 6, 2014

(30) Foreign Application Priority Data
Nov. 22, 2011   (JP) .................................. 2011-255282

(51) Int. Cl.
*H01M 4/60*   (2006.01)
*H01M 10/0525*   (2010.01)
(Continued)

(52) U.S. Cl.
CPC ........... *H01M 4/60* (2013.01); *H01M 4/0404* (2013.01); *H01M 4/0447* (2013.01); *H01M 4/13* (2013.01);
(Continued)

(58) Field of Classification Search
CPC .. H01M 4/60; H01M 4/0404; H01M 10/0525; H01M 10/44; H01M 10/0568;
(Continued)

(56) References Cited

U.S. PATENT DOCUMENTS 7,820,323 B1 * 10/2010 Zhang ............... H01M 10/0525
429/188
2002/0068222 A1   6/2002 Ishii et al.
(Continued)

FOREIGN PATENT DOCUMENTS

JP   2011-34893   2/2001
JP   2002-110153   4/2002
(Continued)

OTHER PUBLICATIONS

U.S. Appl. No. 14/354,884, having national phase entry on Apr. 28, 2014.

*Primary Examiner* — Kenneth Douyette
(74) *Attorney, Agent, or Firm* — Finnegan, Henderson, Farabow, Garrett & Dunner, LLP

(57) ABSTRACT

A non-aqueous electrolyte secondary battery according to the present invention includes a positive electrode, a negative electrode, and a non-aqueous electrolyte solution. The negative electrode includes a coating derived from lithium bis(oxalate)borate. The coating derived from lithium bis(oxalate)borate includes a coating containing boron element and a coating containing oxalate ion. A ratio of the boron element contained in the coating derived from lithium bis(oxalate)borate to the oxalate ion is equal to or more than 5. Accordingly, it is possible to provide a non-aqueous electrolyte secondary battery capable of reliably obtaining the effect due to the formation of a coating.

14 Claims, 6 Drawing Sheets

(51) Int. Cl.
*H01M 4/58* (2010.01)
*H01M 10/0567* (2010.01)
*H01M 10/0568* (2010.01)
*H01M 4/04* (2006.01)
*H01M 4/139* (2010.01)
*H01M 4/36* (2006.01)
*H01M 10/42* (2006.01)
*H01M 4/13* (2010.01)
*H01M 10/058* (2010.01)
*H01M 10/44* (2006.01)
*H01M 4/02* (2006.01)

(52) U.S. Cl.
CPC ........... *H01M 4/139* (2013.01); *H01M 4/366* (2013.01); *H01M 4/5825* (2013.01); *H01M 10/058* (2013.01); *H01M 10/0525* (2013.01); *H01M 10/0567* (2013.01); *H01M 10/0568* (2013.01); *H01M 10/4235* (2013.01); *H01M 10/44* (2013.01); *H01M 2004/027* (2013.01); *H01M 2300/0017* (2013.01)

(58) Field of Classification Search
CPC ... H01M 4/5825; H01M 4/0447; H01M 4/139
See application file for complete search history.

(56) References Cited

U.S. PATENT DOCUMENTS

2008/0305400 A1 12/2008 Beinsan et al.
2010/0323240 A1* 12/2010 Tsujioka ............... C01B 25/455
429/199
2011/0104564 A1* 5/2011 Matsui ............... H01M 4/0445
429/199

FOREIGN PATENT DOCUMENTS

JP 2008-159588 7/2008
JP 2013-97973 5/2013

* cited by examiner

| SAMPLE No. | LiBOB CONCENTRATION (mol/kg) | LiPO₂F₂ CONCENTRATION (mol/kg) | CONDITIONING REQUIREMENTS ||| COATING COMPOSITION ||| BATTERY CHARACTERISTICS ||
| | | | TEMPERATURE (°C) | ΔSOC (%) | PERIOD (day) | B ELEMENT (μmol/cm²) | OXALATE ION (μmol/cm²) | B/C₂O₄ RATIO | IV RESISTANCE VALUE | CAPACITY RETENTION RATIO |
|---|---|---|---|---|---|---|---|---|---|---|
| 1 | 0.025 | 0.025 | 60 | 20 | 7 | 0.21 | 0.035 | 5.9 | 7.62 | 83.0 |
| 2 | 0.025 | 0.025 | 60 | 30 | 7 | 0.20 | 0.020 | 10.0 | 7.50 | 83.1 |
| 3 | 0.025 | 0.025 | 60 | 40 | 7 | 0.20 | 0.015 | 13.4 | 7.44 | 82.5 |
| 4 | 0.025 | 0.025 | 60 | 50 | 7 | 0.21 | 0.016 | 13.1 | 7.46 | 83.1 |
| 5 | 0.025 | 0.025 | — | 0 | — | 0.22 | 0.075 | 2.9 | 8.11 | 83.0 |
| 6 | 0.025 | 0.025 | 60 | 0 | 7 | 0.23 | 0.065 | 3.5 | 7.98 | 82.9 |

Fig. 1

| SAMPLE No. | LiBOB CONCENTRATION (mol/kg) | LiPO₂F₂ CONCENTRATION (mol/kg) | CONDITIONING REQUIREMENTS ||| COATING COMPOSITION ||| BATTERY ||
|---|---|---|---|---|---|---|---|---|---|---|
| | | | TEMPERATURE (°C) | ΔSOC (%) | PERIOD (day) | B ELEMENT (μmol/cm²) | OXALATE ION (μmol/cm²) | B/C₂O₄ RATIO | IV RESISTANCE VALUE (mΩ) | CAPACITY RETENTION RATIO (%) |
| 7 | 0.1 | 0.025 | 60 | 20 | 7 | 0.85 | 0.160 | 5.3 | 9.5 | 85.2 |
| 8 | 0.1 | 0.025 | 60 | 30 | 7 | 0.85 | 0.120 | 7.1 | 9.2 | 85.4 |
| 9 | 0.1 | 0.025 | 60 | 40 | 7 | 0.87 | 0.100 | 8.7 | 9.4 | 84.9 |
| 10 | 0.1 | 0.025 | — | 0 | — | 0.84 | 0.250 | 3.4 | 11.8 | 85.6 |
| 11 | 0.1 | 0.025 | 60 | 0 | 7 | 0.83 | 0.210 | 4.0 | 11.0 | 85.2 |

Fig. 3

| SAMPLE No. | LiBOB CONCENTRATION (mol/kg) | LiPO₂F₂ CONCENTRATION (mol/kg) | CONDITIONING REQUIREMENTS | | | COATING COMPOSITION | | | BATTERY | |
|---|---|---|---|---|---|---|---|---|---|---|
| | | | TEMPERATURE (°C) | ΔSOC (%) | PERIOD (day) | B ELEMENT (μmol/cm²) | OXALATE ION (μmol/cm²) | B/C₂O₄ RATIO | IV RESISTANCE VALUE (mΩ) | CAPACITY RETENTION RATIO (%) |
| 1 | 0.025 | 0.025 | 60 | 20 | 7 | 0.21 | 0.035 | 5.9 | 7.62 | 83.0 |
| 2 | 0.025 | 0.025 | 60 | 30 | 7 | 0.20 | 0.020 | 10.0 | 7.50 | 83.1 |
| 3 | 0.025 | 0.025 | 60 | 40 | 7 | 0.20 | 0.015 | 13.4 | 7.44 | 82.5 |
| 4 | 0.025 | 0.025 | 60 | 50 | 7 | 0.21 | 0.016 | 13.1 | 7.46 | 83.1 |
| 6 | 0.025 | 0.025 | 60 | 0 | 7 | 0.23 | 0.065 | 3.5 | 7.98 | 82.9 |
| 12 | 0.025 | 0.025 | 60 | 60 | 7 | 0.21 | 0.016 | 13.1 | 7.83 | 82.0 |

Fig. 5

NON-AQUEOUS ELECTROLYTE SECONDARY BATTERY AND MANUFACTURING METHOD THEREOF

CROSS-REFERENCE TO RELATED APPLICATIONS

This application is a national phase application of International Application No. PCT/JP2012/005720, filed Sep. 10, 2012, and claims the priority of Japanese Application No. 2011-255282, filed Nov. 22, 2011, the content of both of which is incorporated herein by reference.

TECHNICAL FIELD

The present invention relates to a non-aqueous electrolyte secondary battery and a method of manufacturing a non-aqueous electrolyte secondary battery.

BACKGROUND ART

A lithium secondary battery is an example of non-aqueous electrolyte secondary batteries. The lithium secondary battery is a secondary battery capable of charging and discharging electricity by allowing lithium ions in a non-aqueous electrolyte solution to move between a positive electrode and a negative electrode that absorb and emit lithium ions.

Patent Literature 1 discloses a technique related to a non aqueous electrolyte secondary battery having excellent battery characteristics such as storage characteristics and output characteristics. The non-aqueous electrolyte secondary battery disclosed in Patent Literature 1 includes a positive electrode including a positive-electrode active material, a negative electrode including a negative-electrode active material, and a non-aqueous electrolyte solution. The non-aqueous electrolyte solution contains lithium salt having an oxalate complex as an anion, and acetonitrile. The content of acetonitrile is 0.6 mass % to 1.0 mass % with respect to the content of lithium salt having an oxalate complex as an anion.

CITATION LIST

Patent Literature

[Patent Literature 1] Japanese Unexamined Patent Application Publication No. 2011-34893

SUMMARY OF INVENTION

Technical Problem

Non-aqueous electrolyte secondary batteries have a problem that when the batteries are used in a high-temperature environment, for example, the battery characteristics deteriorate depending on the environment in which the batteries are used. In other words, non-aqueous electrolyte secondary batteries have a problem that the capacity retention ratio of the batteries is lowered, or the internal resistance of each electrode is increased, under the influence of the environment in which the batteries are used.

In order to solve the above-mentioned problems, according to Patent Literature 1, lithium bis(oxalate)borate (LiBOB) is added to a non-aqueous electrolyte solution, and a coating derived from LiBOB is formed on a negative electrode. Also, Patent Literature 1 defines the additive amount of LiBOB to be added to the non-aqueous electrolyte solution. However, the state of the coating derived from LiBOB formed on the negative electrode changes depending on, for example, the conditions for generating the coating. Accordingly, even when the additive amount of LiBOB is defined, the effect due to the formation of the coating changes depending on the state of the coating to be formed.

In view of the above-mentioned problems, it is an object of the present invention to provide a non-aqueous electrolyte secondary battery capable of reliably obtaining the effect due to the formation of a coating, and a method of manufacturing the non-aqueous electrolyte secondary battery.

Solution to Problem

A non-aqueous electrolyte secondary battery according to the present invention includes a positive electrode, a negative electrode, and a non-aqueous electrolyte solution. The negative electrode includes a coating derived from lithium bis(oxalate)borate. The coating contains boron element and oxalate ion. A ratio of the boron element to the oxalate ion is equal to or more than 5.

In the non-aqueous electrolyte secondary battery according to the present invention, the ratio of the boron element to the oxalate ion may be equal to or more than 5.9.

In the non-aqueous electrolyte secondary battery according to the present invention, the ratio of the boron element to the oxalate ion may be equal to or more than 7.1.

In the non-aqueous electrolyte secondary battery according to the present invention, the ratio of the boron element to the oxalate ion may be equal to or more than 10.

In the non-aqueous electrolyte secondary battery according to the present invention, the ratio of the boron element to the oxalate ion may be equal to or more than 13.4.

In the non-aqueous electrolyte secondary battery according to the present invention, the non-aqueous electrolyte solution may contain lithium difluorophosphate.

A method of manufacturing a non-aqueous electrolyte secondary battery according to the present invention is a method of manufacturing a non-aqueous electrolyte secondary battery including a positive electrode, a negative electrode, and a non-aqueous electrolyte solution, the method including: adding lithium bis(oxalate)borate to the non-aqueous electrolyte solution; and performing a conditioning process for charging and discharging the non-aqueous electrolyte secondary battery to form a coating derived from the lithium bis(oxalate)borate on the negative electrode, a ratio of boron element contained in the coating to oxalate ion contained in the coating being set to 5 or more.

In the method of manufacturing a non-aqueous electrolyte secondary battery according to the present invention, the conditioning process may include a process of repeating a process of charging the non-aqueous electrolyte secondary battery to a first state of charge and thereafter discharging the non-aqueous electrolyte secondary battery to a second state of charge, and a range between the first state of charge and the second state of charge may be equal to or more than 20% and equal to or less than 50%.

In the method of manufacturing a non-aqueous electrolyte secondary battery according to the present invention, the range between the first state of charge and the second state of charge may be equal to or more than 30% and equal to or less than 50%.

In the method of manufacturing a non-aqueous electrolyte secondary battery according to the present invention, the range between the first state of charge and the second state of charge may be 40%.

In the method of manufacturing a non-aqueous electrolyte secondary battery according to the present invention, lithium bis(oxalate)borate may be added to the non-aqueous electrolyte solution with a concentration of lithium bis(oxalate) borate of 0.1 mol/kg or less in the non-aqueous electrolyte solution.

In the method of manufacturing a non-aqueous electrolyte secondary battery according to the present invention, lithium bis(oxalate)borate may be added to the non-aqueous electrolyte solution with a concentration of lithium bis(oxalate) borate of 0.025 mol/kg or less in the non-aqueous electrolyte solution.

In the method of manufacturing a non-aqueous electrolyte secondary battery according to the present invention, the non-aqueous electrolyte solution may contain lithium difluorophosphate.

Advantageous Effects of Invention

According to the present invention, it is possible to provide a non-aqueous electrolyte secondary battery capable of reliably obtaining the effect due to the formation of a coating, and a method of manufacturing the non-aqueous electrolyte secondary battery.

BRIEF DESCRIPTION OF DRAWINGS

FIG. 1 is a table showing relationships among conditioning requirements, coating composition, and battery characteristics of non-aqueous electrolyte secondary batteries;

FIG. 3 is a table showing relationships among conditioning requirements, coating composition, and battery characteristics of non-aqueous electrolyte secondary batteries;

FIG. 5 is a table showing relationships among conditioning requirements, coating composition, and battery characteristics of non-aqueous electrolyte secondary batteries.

DESCRIPTION OF EMBODIMENTS

Figure 2:
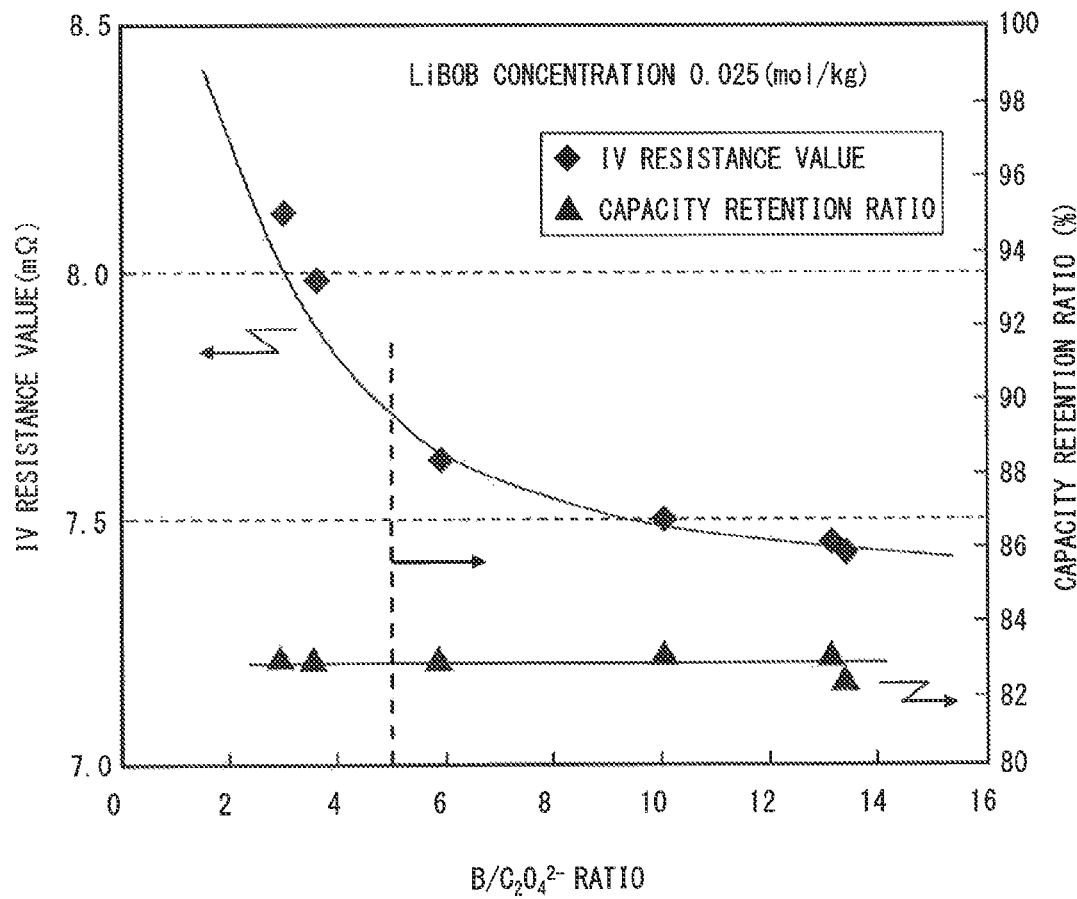
FIG. 2 is a graph showing a relationship between a ratio of boron element to oxalate ion and battery characteristics (IV resistance value, capacity retention ratio)

An embodiment of the present invention will be described below. A non-aqueous electrolyte secondary battery (hereinafter referred to as a lithium secondary battery) according to this embodiment includes at least a positive electrode, a negative electrode, and a non-aqueous electrolyte solution.
<Positive Electrode>

The positive electrode includes a positive-electrode active material. The positive-electrode active material is a material capable of absorbing and emitting lithium. For example, lithium cobalt oxide ($LiCoO_2$), lithium manganese oxide ($LiMn_2O_4$), lithium nickel oxide ($LiNiO_2$), or the like can be used. A material obtained by mixing $LiCoO_2$, $LiMn_2O_4$, and $LiNiO_2$ at a given ratio can also be used. For example, $LiNi_{1/3}Co_{1/3}Mn_{1/3}O_2$ which is obtained by mixing these materials at the same ratio can be used.

The positive electrode may include an electrically conductive material. As the electrically conductive material, for example, acetylene black (AB), carbon black such as Ketjenblack, or graphite can be used.

The positive electrode of the lithium secondary battery according to this embodiment can be prepared by, for example, kneading a positive-electrode active material, an electrically conductive material, a solvent, and a binder, applying a positive electrode mixture, which is obtained after kneading, to a positive electrode collector, and drying the mixture. As the solvent, for example, an NMP (N-methyl-2-pyrrolidone) solution can be used. As the binder, for example, polyvinylidene difluoride (PVdF), styrene-butadiene rubber (SBR), polytetrafluoroethylene (PTFE), carboxymethyl cellulose (CMC), or the like can be used. As the positive electrode collector, aluminum or an alloy containing aluminum as a main component can be used.
<Negative Electrode>

A negative-electrode active material is a material capable of absorbing and emitting lithium. For example, a powder carbon material including graphite or the like can be used. Similarly to the positive electrode, the negative electrode can be prepared by kneading a negative-electrode active material, a solvent, and a binder, applying a negative electrode mixture, which is obtained after kneading, to a negative electrode collector, and drying the resultant. As the negative electrode collector, for example, copper, nickel, or an alloy of these materials can be used.
<Non-Aqueous Electrolyte Solution>

The non-aqueous electrolyte solution is a composition containing a supporting electrolyte in a non-aqueous solvent. As the non-aqueous solvent, one type or two or more types of materials selected from the group consisting of propylene carbonate (PC), ethylene carbonate (EC), diethyl carbonate (DEC), dimethyl carbonate (DMC), ethyl methyl carbonate (EMC), and the like can be used. As the supporting electrolyte, one type or two or more types of lithium compounds (lithium salt) selected from the group consisting of $LiPF_6$, $LiBF_4$, $LiClO_4$, $LiAsF_6$, $LiCF_3SO_3$, $LiC_4F_9SO_3$, $LiN(CF_3SO_2)_2$, $LiC(CF_3SO_2)_3$, LiI, and the like can be used. In the lithium secondary battery according to this embodiment, lithium difluorophosphate ($LiPO_2F_2$) may be added to the non-aqueous electrolyte solution.

Further, in the lithium secondary battery according to this embodiment, lithium bis(oxalate)borate (LiBOB) is added to the non-aqueous electrolyte solution. For example, LiBOB is added to the non-aqueous electrolyte solution with a LiBOB concentration of 0.1 mol/kg or less in the non-aqueous electrolyte solution. At this time, LiBOB may be added to the non-aqueous electrolyte solution with a LiBOB concentration of 0.025 mol/kg or less in the non-aqueous electrolyte solution.
<Separator>

The lithium secondary battery according to this embodiment may include a separator. As the separator, a porous polymer film such as a porous polyethylene film, a porous polyolefin film, or a porous polyvinyl chloride film, or a lithium ion or ionic conductive polymer electrolyte film can be used singly or in combination.
<Lithium Secondary Battery>

Hereinafter, a lithium secondary battery including a wound electrode body will be described as an example. In the lithium secondary battery according to this embodiment, an electrode body (wound electrode body) having a form in which an elongated positive electrode sheet (positive electrode) and an elongated negative electrode sheet (negative electrode) are wound in a flat shape with an elongated separator interposed therebetween is housed with a non-aqueous electrolyte solution in a container having a shape that can house the wound electrode body.

The container includes a flat rectangular parallelepiped container body with an open upper end, and a lid body that seals the opening. As a material for forming the container, a metallic material such as aluminum or steel is preferably used. Alternatively, a container obtained by molding a resin material such as polyphenylene sulfide resin (PPS) or polyimid resin can also be used. The upper surface (that is, the lid body) of the container is provided with a positive electrode terminal electrically connected to a positive electrode of the wound electrode body and a negative electrode terminal electrically connected to a negative electrode of the wound electrode body. The container houses the flat wound electrode body together with the non-aqueous electrolyte solution.

The positive electrode sheet has a structure in which positive electrode mixture layers including a positive-electrode active material are held on both surfaces of a foil-like positive electrode collector. Similarly to the positive electrode sheet, the negative electrode sheet has a structure in which negative electrode mixture layers including a negative-electrode active material are held on both surfaces of a foil-like negative electrode collector. In the case of preparing the wound electrode body, the positive electrode sheet and the negative electrode sheet are stacked with the separator interposed therebetween. The stacked structure obtained by stacking the sheets is wound, and the wound body thus obtained is pressed in a lateral direction, thereby preparing the flat wound electrode body.

A positive electrode lead terminal and a negative electrode lead terminal are respectively provided to the portions at both ends of the wound electrode body where the positive electrode sheet and the negative electrode sheet are respectively exposed (the portions where the positive electrode mixture layer and the negative electrode mixture layer are not formed), and the positive electrode terminal and the negative electrode terminal are electrically connected to the positive electrode lead terminal and the negative electrode lead terminal, respectively. In this manner, the wound electrode body thus prepared is housed in the container body, and the non-aqueous electrolyte solution is poured into the container body. Then the opening of the container body is sealed with the lid body. In this manner, the lithium secondary battery according to this embodiment can be prepared.

<Conditioning Process>

A conditioning process is performed on the lithium secondary battery prepared by the method described above. The conditioning process can be performed by repeating charging and discharging of the lithium secondary battery a predetermined number of times. An example of the conditioning process is given below.

First, the lithium secondary battery is charged at a constant current and a constant voltage to 4.1 V at a charge rate of 1 C a temperature environment of 60° C., and the state of charge is set to an SOC (State of Charge) of 100%. Next, the lithium secondary battery is discharged at a constant current and a constant voltage to 3.0 V at a discharge rate of 1 C in a temperature environment of 60° C., and the state of charge is set to an SOC of 0%. After that, charging and discharging in a predetermined SOC range at a charge rate of 1 C are repeated for a predetermined period of time in a temperature environment of 60° C. The time period for the conditioning process may be, for example, seven days.

The term "SOC range" refers to a range of SOC with an SOC of 50% at the center, for example. When the SOC range is 20%, for example, the state of charge is first set to an SOC of 100%, and then the state of charge is set to an SOC of 0%. After that, a process of charging the lithium secondary battery to an SOC of 60% (a first state of charge) and thereafter discharging the lithium secondary battery to an SOC of 40% (a second state of charge) is repeated for a predetermined period of time (i.e., charging and discharging are repeated in the range (an SOC range of 20%) between the SOC of 40% and the SOC of 60%). In this case, the SOC range (the range between the first state of charge and the second state of charge) may be, for example, equal to or more than 20% and equal to or less than 50%, more preferably, equal to or more than 30% and equal to or less than 50%, and still more preferably, 40%.

Note that the requirements for the conditioning process are not limited to the above-mentioned requirements. The charge rate, the discharge rate, the set voltage for charging/discharging, the time period for the conditioning process, and the SOC range can be arbitrarily set. In the lithium secondary battery according to this embodiment, the conditioning process is performed to thereby make it possible to form a coating derived from lithium bis(oxalate)borate (LiBOB) on the surface of the negative electrode. The coating derived from LiBOB is formed due to the reductive decomposition of LiBOB, which is added to the non-aqueous electrolyte solution, on the surface of the negative electrode when the conditioning processing is performed.

<Evaluation of the Lithium Secondary Battery>

In the lithium secondary battery according to this embodiment, the ratio of the boron element to the oxalate ion in the coating derived from LiBOB formed on the negative electrode is evaluated, thereby enabling evaluation of the lithium secondary battery. The amount of boron element contained in the coating derived from LiBOB can be evaluated by using, for example, an ICP (Inductively Coupled Plasma) emission spectrometry analysis method. The amount of oxalate ion contained in the coating derived from LiBOB can be evaluated by using, for example, an ion chromatograph.

In the lithium secondary battery according to this embodiment, the ratio of the boron element to the oxalate ion in the coating (the amount of boron element/the amount of oxalate ion) is set to 5 or more. Thus, when the ratio of the boron element to the oxalate ion is set to 5 or more, the battery characteristics of the lithium secondary battery can be improved. Further, when the ratio of the boron element to the oxalate ion is set to 5.9 or more, more preferably, 7.1 or more, still more preferably, 10 or more, and yet more preferably, 13.4 or more, the battery characteristics of the lithium secondary battery can be further improved.

For example, in order to form a coating with a ratio of boron element to oxalate ion of 5 or more on the negative electrode, the SOC range is set to 20% or more when charging and discharging are repeated in the conditioning process in a high-temperature condition (60° C.). The conditioning requirements for forming a coating with a ratio of boron element to oxalate ion of 5 or more on the negative electrode are not limited to the above-mentioned conditioning requirements. Any conditioning requirements other than the above-mentioned conditioning requirements can be used.

Lithium secondary batteries have a problem that the battery characteristics deteriorate depending on the environment in which the batteries are used; for example, when the batteries are used in a high-temperature environment. In other words, lithium secondary, batteries have a problem that the capacity retention ratio of the batteries is lowered, or the internal resistance of each electrode is increased, under the influence of the environment in which the batteries are used.

In order to solve the above-mentioned problems, according to Patent Literature 1, lithium bis(oxalate)borate (LiBOB) is added to a non-aqueous electrolyte solution, and a coating derived from LiBOB is formed on a negative electrode. Also, Patent Literature 1 defines the additive amount of LiBOB to be added to the non-aqueous electrolyte solution. However, the state of the coating derived from LiBOB formed on the negative electrode changes depending on, for example, the conditions for generating the coating. Accordingly, even when the additive amount of LiBOB is defined, the effect due to the formation of the coating changes depending on the state of the coating to be formed. Therefore, it is apprehended that even when LiBOB is added to the non-aqueous electrolyte solution, the effect of improving the battery characteristics due to the formation of the coating is not obtained.

Lithium bis(oxalate)borate (LiBOB), which has a four-coordinate structure with boron having oxalate complexes, is considered to form a coating containing boron as a result of a reaction to be described below. At this time, a coating containing oxalate ion $C_2O_4^{2-}$ is also generated. Although the coating containing boron has an effect of improving the battery characteristics (capacity retention ratio), the coating containing oxalate ion $C_2O_4^{2-}$ is a high-resistance coating, which may cause an increase in the internal resistance of each electrode and deteriorate the battery characteristics. Therefore, it is apprehended that even when LiBOB is added to the non-aqueous electrolyte solution, the effect of improving the battery characteristics due to the formation of the coating is not obtained.

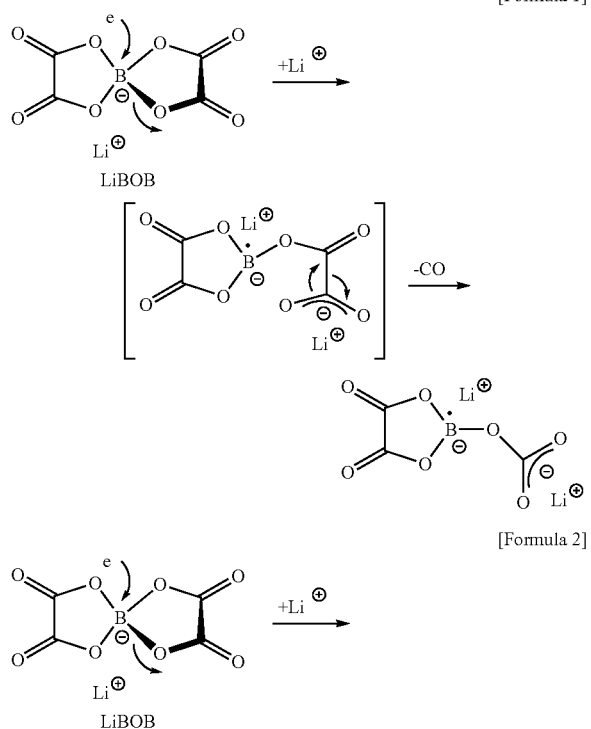

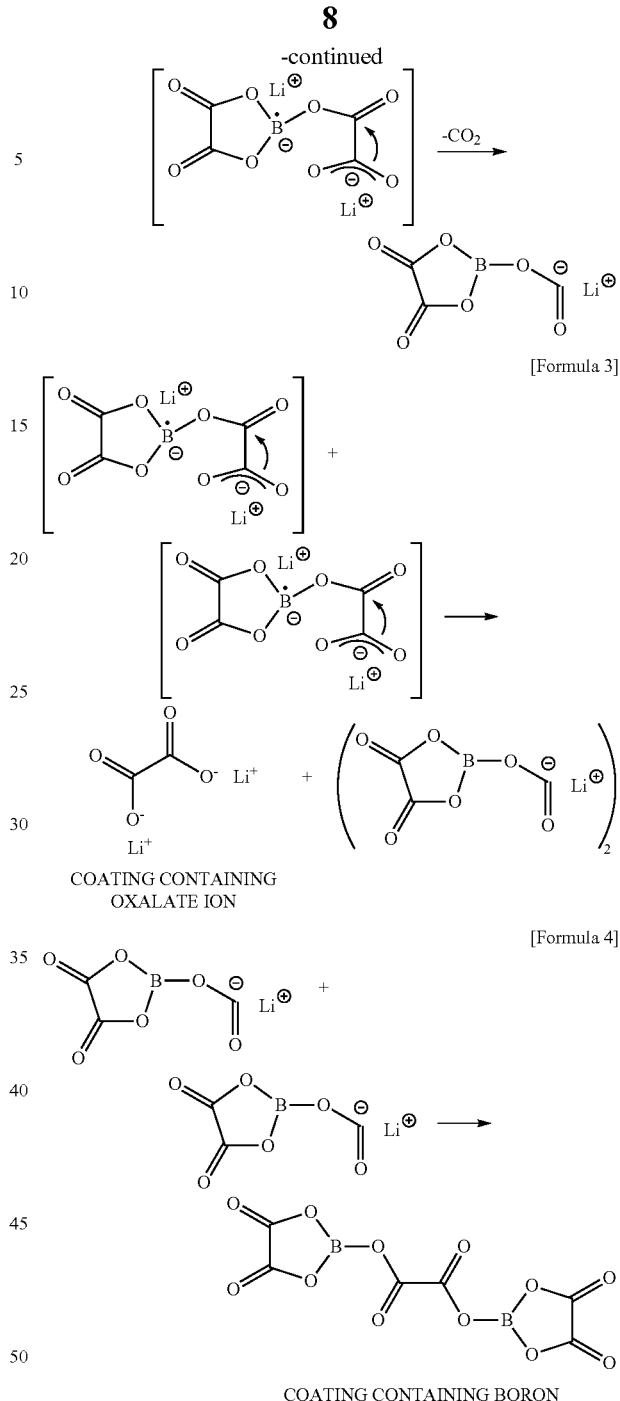

In the lithium secondary battery according to this embodiment, when LiBOB is added to the non-aqueous electrolyte solution and when the ratio of the boron element to the oxalate ion in the coating derived from LiBOB formed on the surface of the negative electrode is set to 5 or more, the battery characteristics can be improved. In other words, the ratio of the boron element to the oxalate ion in the coating is set to an appropriate value, thereby suppressing an increase in the internal resistance of the negative electrode due to the coating containing oxalate ion, while improving the capacity retention ratio by using the coating containing boron, resulting in an improvement of the battery characteristics.

The decomposition of a coating containing oxalate ion is promoted by applying heat thereto, and the coating can be removed as a carbon dioxide gas from the negative electrode coating. Accordingly, the coating containing the oxalate ion can be removed by carrying out the conditioning process in which the secondary lithium battery is left in a high-temperature condition. However, simply carrying out the conditioning process in which the lithium secondary battery is left in a high-temperature condition is not enough to sufficiently reduce the amount of oxalate ion, because a coating derived from an electrolyte is further formed on the coating derived from LiBOB, which inhibits the desorption of the oxalate ion. For this reason, in the lithium secondary battery according to this embodiment, the process of repeating charging and discharging in a predetermined SOC range is carried out in the conditioning process in a high-temperature condition. By carrying out such a process, the volume of the negative-electrode active material can be changed and a crack can be formed in the coating derived from the electrolyte during the conditioning process. Through this crack, a carbon dioxide gas generated due to the decomposition of the oxalate ion can be emitted. Therefore, it is considered that this promotes the desorption of the oxalate ion and enables formation of a low-resistance coating on the negative electrode.

The invention according to this embodiment described above can provide a non-aqueous electrolyte secondary battery capable of reliably obtaining the effect due to the formation of a coating, and a method of manufacturing the non-aqueous electrolyte secondary battery.

EXAMPLES

Next, examples of the present invention will be described.
<Preparation of the Positive Electrode>

The mass ratio of materials including $LiNi_{1/3}Co_{1/3}Mn_{1/3}O_2$ as a positive-electrode active material, acetylene black (AB) as an electrically conductive material, and PVDF as a binder was adjusted to 90:8:2. These adjusted materials were mixed and kneaded with an NMP (N-methyl-2-pyrrolidone) solution. The positive electrode mixture obtained after kneading was applied, in a band shape, to both surfaces of an elongated aluminum foil (positive electrode collector) with a thickness of 15 μm and was dried, thereby preparing a positive electrode sheet having a structure in which positive electrode mixture layers are formed on both of the surfaces of the positive electrode collector. The total amount of the positive electrode mixture applied to both of these surfaces was adjusted to about 12 mg/cm$^2$ (solid content standards). After drying, the resultant was pressed to a positive electrode mixture layer density of about 2.2 g/cm$^3$.

<Preparation of the Negative Electrode>

A negative electrode mixture was prepared by dispersing materials including natural graphite powder as a negative-electrode active material, SBR, and CMC into water at a mass ratio of 98:1:1. This negative electrode mixture was applied to both surfaces of an elongated copper foil (negative electrode collector) with a thickness of 10 μm and was dried, thereby preparing a negative electrode sheet having a structure in which negative electrode mixture layers are formed on both of the surfaces of the negative electrode collector. The total amount of the negative electrode mixture applied to both of these surfaces was adjusted to about 7.5 mg/cm$^2$ (solid content standards). After drying, the resultant was pressed to a negative electrode mixture layer density of about 1.1 g/cm$^3$.

<Lithium Secondary Battery>

The positive electrode sheet and the negative electrode sheet, which were prepared as described above, were stacked with two separators (separators which are made of porous polyethylene and have a monolayer structure were used) interposed therebetween and were wound, and the wound body was pressed in a lateral direction, thereby preparing a flat wound electrode body. This wound electrode body and the non-aqueous electrolyte solution were housed in a box-shaped battery container, and the opening of the battery container was air tightly sealed.

A solution obtained by adding $LiPF_6$ as a supporting electrolyte with a concentration of 1.0 mol/kg to a mixed solvent including EC, EMC, and DMC at a volume ratio of 1:1:1 and further adding thereto lithium difluorophosphate ($LiPO_2F_2$) with a concentration of 0.025 mol/kg was used as the non-aqueous electrolyte solution. Further, LiBOB was added with a LiBOB concentration in the non-aqueous electrolyte solution of 0.025 mol/kg or 0.1 mol/kg. In this manner, the lithium secondary battery was assembled.

<Conditioning Process>

A conditioning process was performed on the lithium secondary battery assembled as described above. First, the lithium secondary battery was charged at a constant current and a constant voltage to 4.1 V at a predetermined charge rate in a temperature environment of 60° C., and the state of charge was set to an SOC of 100%. After that, the lithium secondary battery was discharged at a constant current and a constant voltage to 3.0 V at a predetermined discharge rate in a temperature environment of 60° C., and the state of charge was set to an SOC of 0%. Further, the lithium secondary battery was charged to an SOC of 50% at a predetermined charge rate in a temperature environment of 60° C., and charging and discharging were repeated for seven days in a predetermined SOC range (20%, 30%, 40%, 50%, and 60%) with the SOC of 50% at the center. The predetermined charge and discharge rates described above were 1 C when ΔSOC was 20%; 1.5 C when ΔSOC was 30%; 2 C when ΔSOC was 40%; 2.5 C when ΔSOC was 50%; and 3 C when ΔSOC was 60%.

<Measurement of the Ratio Between Boron Element and Oxalate Ion>

After the conditioning process, the ratio of the boron element to the oxalate ion in the coating derived from LiBOB formed on the negative electrode was evaluated. The amount of the boron element was evaluated by using the ICP emission spectrometry analysis method. The amount of the oxalate ion was evaluated by using the ion chromatograph.

<Measurement of the IV Resistance Value>

After the conditioning process, the internal resistance value (initial resistance value) of each lithium secondary battery was measured. The internal resistance value was measured by adjusting each lithium secondary battery to an SOC of 50% and measuring the battery voltage when 10 seconds had passed after currents of 1 A, 2 A, 4 A, 8 A, and 12 A were caused to flow in a temperature environment of −10° C. The currents caused to flow through each lithium secondary battery and the voltages thereof were linearly approximated, and an internal resistance value (IV resistance value) was obtained from the slope of the straight line.

<Measurement of the Capacity Retention Ratio>

A retention endurance test was conducted on each lithium secondary battery prepared as described above, and the capacity retention ratio thereof was measured. The retention endurance test was conducted in such a manner that the state of charge of the lithium secondary battery obtained after the conditioning process was adjusted to an SOC of 80% and the lithium secondary battery was then left for a month in an environment of 60° C. Further, the capacity retention ratio was measured in the following manner.

The capacity retention ratio was obtained by using the following formula, assuming that the discharge capacity obtained before the retention endurance test is a discharge capacity A and the discharge capacity obtained after the retention endurance test is a discharge capacity B.

capacity retention ratio (%)=(discharge capacity $B$/discharge capacity $A$)×100

Note that the discharge capacity A and the discharge capacity B were calculated as follows. First, in a temperature environment of 25° C., each lithium secondary battery was discharged at a constant current of 4 A so that the battery voltage changed from an upper limit voltage value of 4.2 V to a lower limit voltage value of 3.0 V. The capacity retention ratio was calculated from the discharge capacity (Ah) obtained at this time.

<Test Result 1>

First, shown below is the test result obtained when the concentration of LiBOB in the non-aqueous electrolyte solution is 0.025 mol/kg. FIG. 1 is a table showing relationships among conditioning requirements, coating composition, and battery characteristics of non-aqueous electrolyte secondary batteries prepared as described above. FIG. 2 is a graph showing a relationship between the ratio of boron element to oxalate ion and battery characteristics (IV resistance value, capacity retention ratio).

As shown in the table of FIG. 1, the conditioning process was carried out in an SOC range (ΔSOC) of 20% in Sample No. 1; the conditioning process was carried out in an SOC range of 30% in Sample No. 2; the conditioning process was carried out in an SOC range of 40% in Sample No. 3; and the conditioning process was carried out in an SOC range of 50% in Sample No. 4. In Sample No. 5, the conditioning process was not carried out. Sample No. 6 was charged at a constant current and a constant voltage to 4.1 V at a charge rate of 1 C in a temperature environment of 60° C. After that, the conditioning process was carried out by leaving the sample for seven days in a temperature environment of 60° C.

As shown in the graph of FIG. 2, the capacity retention ratio was not dependent on the ratio of boron element to oxalate ion ($B/C_2O_4^{2-}$), and was substantially constant. In other words, since the amount of boron element was substantially constant in each sample as shown in the table of FIG. 1, it is considered that a stable coating containing boron was formed on the negative electrode of each sample and the decomposition of the solvent on the surface of the negative electrode was suppressed, resulting in an improvement of the capacity retention ratio in each sample.

On the other hand, it has turned out that the IV resistance value increases when the ratio of boron element to oxalate ion ($B/C_2O_4^{2-}$) is smaller than 5. Specifically, as shown in the table of FIG. 1, when the ratio of boron element to oxalate ion ($B/C_2O_4^{2-}$) is smaller than 5 (Samples No. 5 and No. 6), the IV resistance value was increased because the amount of oxalate ion was large. Accordingly, it turned out that it is necessary to set the ratio of boron element to oxalate ion ($B/C_2O_4^{2-}$) to 5 or more so as to reduce the IV resistance value. Further, in the cases where the ratio of boron element to oxalate ion ($B/C_2O_4^{2-}$) was set to 5.9 or more, 10 or more, and 13.4 or more, the IV resistance value was further reduced.

As described above, when the ratio of boron element to oxalate ion ($B/C_2O_4^{2-}$) was set to 5 or more, an increase in the internal resistance of the negative electrode due to the coating containing oxalate ion was suppressed, while the capacity retention ratio was improved by using the coating containing boron.

<Test Result 2>

Figure 4:
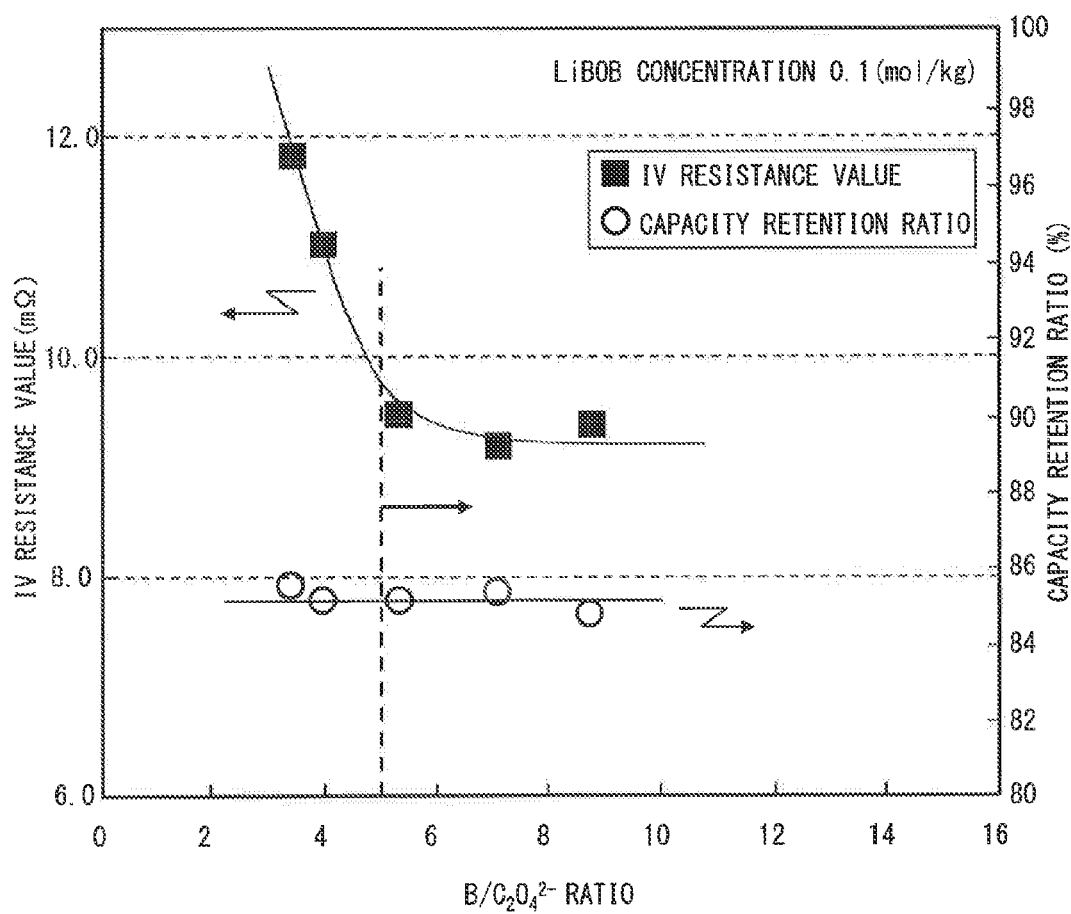
FIG. 4 is a graph showing a relationship between a ratio of boron element to oxalate ion and battery characteristics (IV resistance value, capacity retention ratio)

Next, shown below is the test result obtained when the concentration of LiBOB in the non-aqueous electrolyte solution is 0.1 mol/kg. FIG. 3 is a table showing relationships among conditioning requirements, coating composition, and battery characteristics of lithium secondary batteries prepared as described above. FIG. 4 is a graph showing a relationship between the ratio of boron element to oxalate ion, and battery characteristics (IV resistance value, capacity retention ratio).

As shown in the table of FIG. 3, the conditioning process was carried out in an SOC range of 20% in Sample No. 7; the conditioning process was carried out in an SOC range of 30% in Sample. No. 8; and the conditioning process was carried out in an SOC range of 40% in Sample No. 9. In Sample No. 10, the conditioning process was not carried out. Sample No. 11 was charged at a constant current and a constant voltage to 4.1 V at a charge rate of 1 C in a temperature environment of 60° C. After that, the conditioning process was carried out by leaving the sample for seven days in a temperature environment of 60° C.

As shown in the graph of FIG. 4, the capacity retention ratio was not dependent on the ratio of boron element to oxalate ion ($B/C_2O_4^{2-}$), and was substantially constant. In other words, since the amount of boron element was substantially constant in each sample as shown in the table of FIG. 3, it is considered that a stable coating containing boron was formed on the negative electrode of each sample and the decomposition of the solvent on the surface of the negative electrode was suppressed, resulting in an improvement of the capacity retention ratio in each sample.

On the other hand, it has turned out that the IV resistance value increases when the ratio of boron element to oxalate ion ($B/C_2O_4^{2-}$) is smaller than 5. Specifically, as shown in the table of FIG. 3, when the ratio of boron element to oxalate ion ($B/C_2O_4^{2-}$) is smaller than 5 (Samples No. 10 and No. 11), the IV resistance value was increased because the amount of oxalate ion was large. Accordingly, it has turned out that it is necessary to set the ratio of boron element to oxalate on ($B/C_2O_4^{2-}$) to 5 or more so as to reduce the IV resistance value.

As described above, when the ratio of boron element to oxalate ion ($B/C_2O_4^{2-}$) was set to 5 or more, an increase in the internal resistance of the negative electrode due to the coating containing oxalate ion was suppressed, while the capacity retention ratio was improved by using the coating containing boron.

Comparing the test result 1 with the test result 2, when the concentration of LiBOB was 0.1 mol/kg, the capacity retention ratio and the IV resistance value were increased as a whole, as compared with the case where the concentration of LiBOB was 0.025 mol/kg. This is considered to be because when the concentration of LiBOB is high, the amount of a coating that is derived from LiBOB and formed on the negative electrode (a coating containing boron and a coating containing oxalate ion) is increased.

<Proper Range of the SOC Range>

Figure 6:
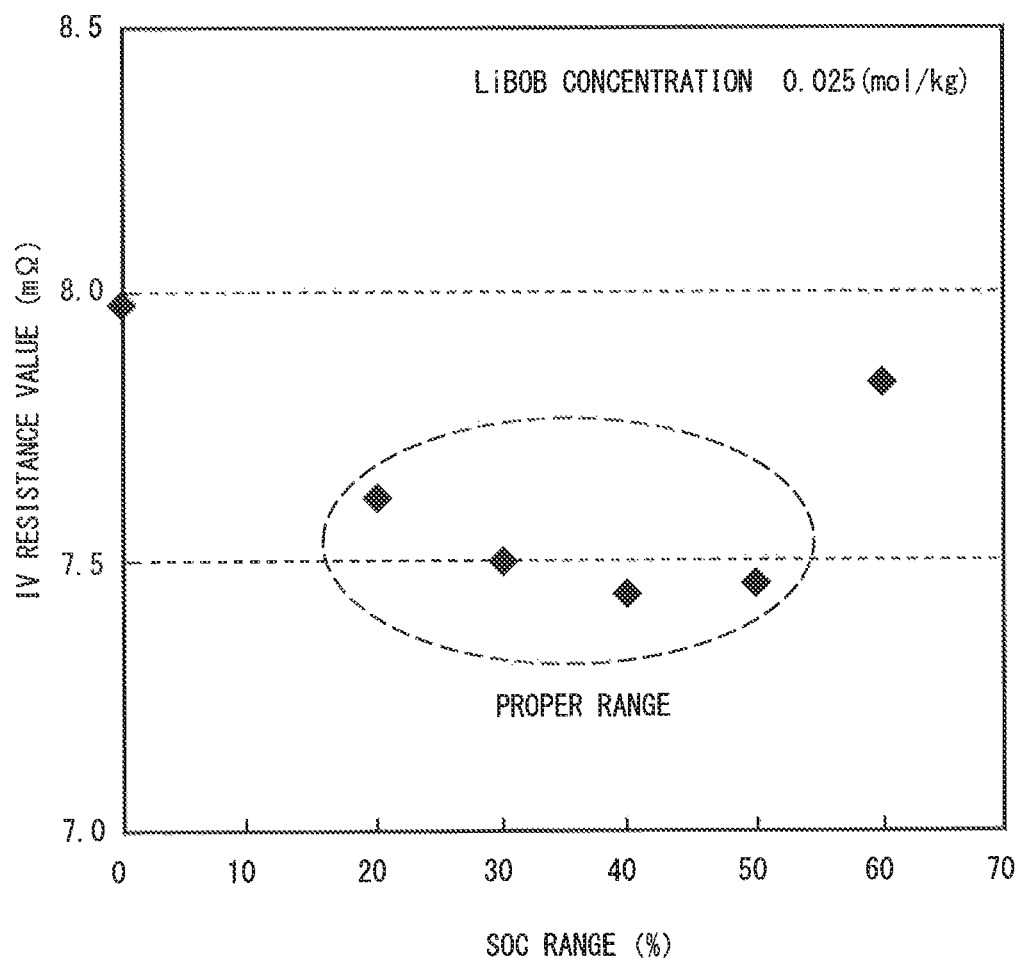
FIG. 6 is a graph showing a relationship between an SOC range and a IV resistance value in a conditioning process.

FIG. 5 is a table showing relationships among conditioning requirements, coating composition, and battery characteristics of lithium secondary batteries prepared as described above. FIG. 6 is a graph showing a relationship between the SOC range and the IV resistance value in the conditioning process. The test results shown in FIGS. 5 and 6 are test results obtained when the concentration of LiBOB in the non-aqueous electrolyte solution is 0.025 mol/kg.

As shown in the table of FIG. 5, the conditioning process was carried out in an SOC range of 20% in Sample No. 1; the conditioning process was carried out in an SOC range of 30% in Sample No. 2; the conditioning process was carried out in an SOC range of 40% in Sample No. 3; the conditioning process was carried out in an SOC range of 50% in Sample No. 4; and the conditioning process was carried out in an SOC range of 60% in Sample No. 12. Sample No. 6 was charged at a constant current and a constant voltage to 4.1 V at a charge rate of 1 C in a temperature condition of 60° C. After that, the conditioning process was carried out by leaving the sample for seven days in a temperature condition of 60° C.

As shown in the graph of FIG. 6, the IV resistance value was increased when the SOC range was 0% and when the SOC range was 60%. On the other hand, when the SOC range was equal to or more than 20% and equal to or less than 50%, the IV resistance value was a relatively small value. When the SOC range was equal to or more than 20% and equal to or less than 50%, the IV resistance value was a much smaller value, and when the SOC range was 40%, the IV resistance value was a smallest value.

From the results shown in FIGS. 5 and 6, it has turned out that the proper range of the SOC range is equal to or more than 20% and equal to or less than 50%. In other words, it is considered that when the SOC range is set to 20% or more and 50% or less, the volume of the negative-electrode active material can be changed and a crack can be formed in the coating derived from the electrolyte during the conditioning process. Through this crack, a carbon dioxide gas generated due to the decomposition of the oxalate ion can be emitted. Therefore, it is considered that this promotes the desorption of the oxalate ion and enables formation of a coating derived from LiBOB and having a lower resistance. On the other hand, it is considered that when the SOC range was extremely large (SOC range of 60%), the positive electrode was exposed to a high potential and the resistance value of the positive electrode was increased, so that the IV resistance value was increased by contrast.

The present invention has been described above with reference to the embodiments and examples described above. However, the present invention is not limited only to the configurations of the embodiments and examples described above, but includes various modifications, alterations, and combinations which can be made by those skilled in the art within the scope of the claims of the present application, as a matter of course.

The invention claimed is:

1. A non-aqueous electrolyte secondary battery, comprising:
    a positive electrode;
    a negative electrode; and
    a non-aqueous electrolyte solution, wherein
    the negative electrode includes a coating,
    the coating contains
        a compound containing boron element, the compound being represented by the following formula:

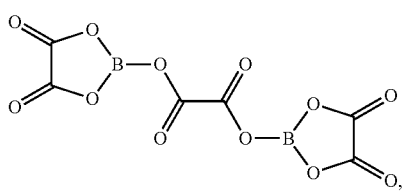 [SMILES: O=C1OB(OC(=O)C(=O)OB2OC(=O)C(=O)O2)OC1=O]

and
    an oxalate ion, and
    a ratio of the boron element to the oxalate ion is equal to or more than 5.

2. The non-aqueous electrolyte secondary battery according to claim 1, wherein the ratio of the boron element to the oxalate ion is equal to or more than 5.9.

3. The non-aqueous electrolyte secondary battery according to claim 1, wherein the ratio of the boron element to the oxalate ion is equal to or more than 7.1.

4. The non-aqueous electrolyte secondary battery according to claim 1, wherein the ratio of the boron element to the oxalate ion is equal to or more than 10.

5. The non-aqueous electrolyte secondary battery according to claim 1, wherein the ratio of the boron element to the oxalate ion is equal to or more than 13.4.

6. The non-aqueous electrolyte secondary battery according to claim 1, wherein the non-aqueous electrolyte solution contains lithium difluorophosphate.

7. The non-aqueous electrolyte secondary battery according to claim 1, wherein the compound containing boron element and the oxalate ion contained in the coating are products of a reductive decomposition of a lithium bis(oxalate)borate.

8. A method of manufacturing a non-aqueous electrolyte secondary battery including a positive electrode, a negative electrode, and a non-aqueous electrolyte solution, the method comprising:
    adding lithium bis(oxalate)borate to the non-aqueous electrolyte solution; and
    performing a conditioning process for charging and discharging the non-aqueous electrolyte secondary battery to form a coating containing a compound containing boron element and oxalate ion, wherein the compound containing boron element and oxalate ion are products of the reductive decomposition of the lithium bis(oxalate)borate on the negative electrode, a ratio of boron element contained in the coating to oxalate ion contained in the coating being set to 5 or more, wherein the compound is represented by the following formula:

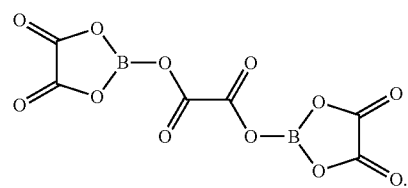 [SMILES: O=C1OB(OC(=O)C(=O)OB2OC(=O)C(=O)O2)OC1=O]

9. The method of manufacturing a non-aqueous electrolyte secondary battery according to claim 8, wherein
    the conditioning process includes a process of repeating a process of charging the non-aqueous electrolyte secondary battery to a first state of charge and thereafter discharging the non-aqueous electrolyte secondary battery to a second state of charge, and
    a range between the first state of charge and the second state of charge is equal to or more than 20% and equal to or less than 50%.

10. The method of manufacturing a non-aqueous electrolyte secondary battery according to claim 9, wherein the range between the first state of charge and the second state of charge is equal to or more than 30% and equal to or less than 50%.

11. The method of manufacturing a non-aqueous electrolyte secondary battery according to claim 9, wherein the range between the first state of charge and the second state of charge is 40%.

12. The method of manufacturing a non-aqueous electrolyte secondary battery according to claim 8, wherein lithium bis(oxalate)borate is added to the non-aqueous electrolyte solution with a concentration of lithium bis(oxalate)borate of 0.1 mol/kg or less in the non-aqueous electrolyte solution.

13. The method of manufacturing a non-aqueous electrolyte secondary battery according to claim 8, wherein lithium bis(oxalate)borate is added to the non-aqueous electrolyte solution with a concentration of lithium bis(oxalate)borate of 0.025 mol/kg or less in the non-aqueous electrolyte solution.

14. The method of manufacturing a non-aqueous electrolyte secondary battery according to claim 8, wherein the non-aqueous electrolyte solution contains lithium difluorophosphate.

* * * * *